(No Model.)

J. ROLLING.
CAR WHEEL.

No. 504,790. Patented Sept. 12, 1893.

Witnesses:

Jno. Rolling,
Inventor

By Edson Bros,
Atty's.

UNITED STATES PATENT OFFICE.

JOHN ROLLING, OF SCRANTON, PENNSYLVANIA.

CAR-WHEEL.

SPECIFICATION forming part of Letters Patent No. 504,790, dated September 12, 1893.

Application filed May 20, 1893. Serial No. 474,956. (No model.)

*To all whom it may concern:*

Be it known that I, JOHN ROLLING, a citizen of England, residing at Scranton, in the county of Lackawanna and State of Pennsylvania, have invented certain new and useful Improvements in Tires for Railway-Car Wheels; and I do hereby declare the following to be a full, clear, and exact description of the invention, such as will enable others skilled in the art to which it appertains to make and use the same.

My invention relates to improvements in tires for railway car wheels; and the object of the invention is to provide a strong sectional tire which can be readily secured on or detached from a car wheel of any desired style whereby in case of injury to the tire the damaged section can be quickly and easily removed and a new one secured in position without removing the wheel and sending it to a repair shop as is necessary where the tire is secured on the wheel in the ordinary manner.

With these ends in view, my invention consists in the peculiar combination and arrangement of parts as will be hereinafter pointed out and claimed.

Figure 1:
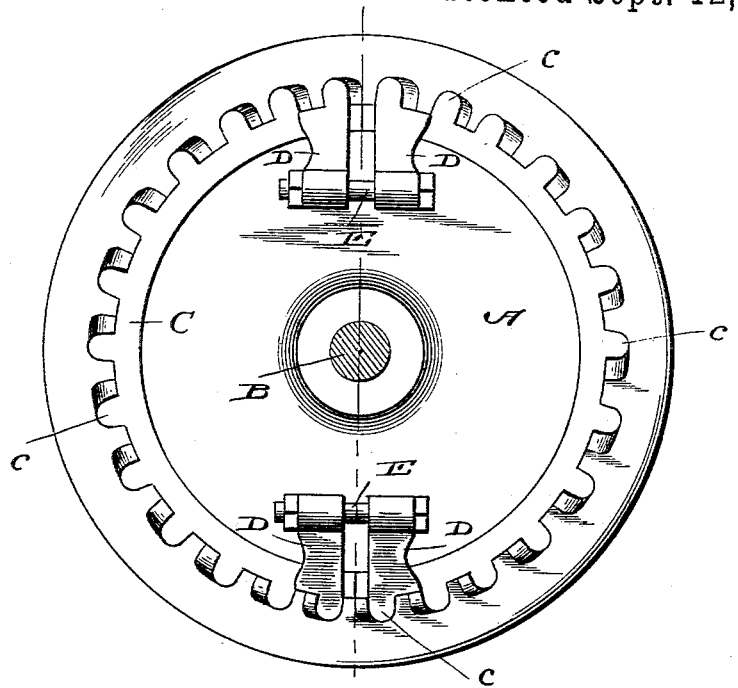
Figure 2:
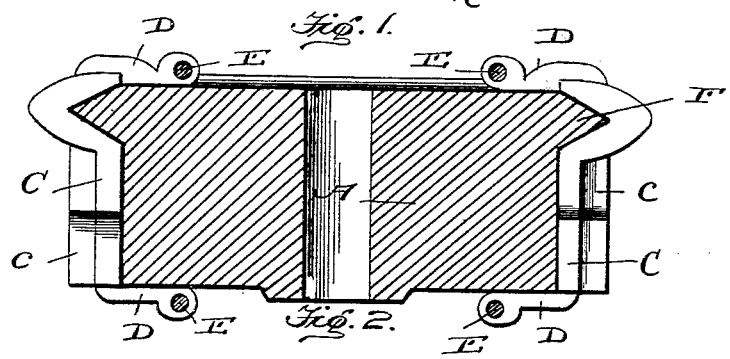
Figure 3:
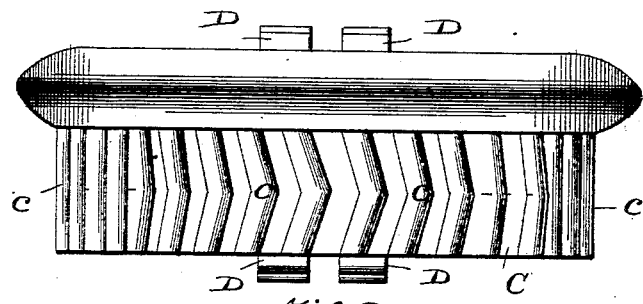

In the accompanying drawings—Figure 1 is a side elevation of a railway car wheel provided with my improved tire. Fig. 2 is a sectional view on the line $x$—$x$ of Fig. 1. Fig. 3 is a top plan view.

Like letters of reference denote corresponding parts in the several figures of the drawings, referring to which—

A designates the body of a railway car wheel and B the axle of the car on which the wheel A is secured. The tire, C, is preferably made of cast steel and composed of sections adapted to be firmly secured together and to the wheel A.

In the drawings I have shown my improved tire as made in two sections each of which is provided at its ends, on both sides, with aligned lugs D, which extend inwardly over the faces of the body of the wheel and in which, near their free ends, are formed aligned passages through which securing bolts E are designed to be passed. The bolts E are provided at one end with enlarged heads and on the other ends of such bolts are screwed suitable nuts, by means of which the adjacent ends of the sections of the tire can be drawn close together and held in such position. The tire is thus clamped firmly on the wheel A; but by loosening the nuts on the securing bolts either or both of the sections can be readily removed from the wheel and replaced by new sections. The lugs, D, extend on opposite sides of the body of the wheel and operate to prevent the tire from slipping laterally therefrom.

To more effectually and securely lock the tire of the wheel, I preferably form, in the inner face of the flange C, of the tire, an annular groove which conforms in cross section to the shape of an annular peripheral rib F formed integral with the body of the wheel and adapted to fit snugly in the groove in the rail flange of the tire.

In order that wheels provided with my improvements may obtain a firm hold on the rails of the track and not slip thereon in rainy weather or when said rails are coated with ice I prefer to corrugate or roughen the tread of the tire. As shown in Fig. 3 of the drawings the ribs $c$ on the tread of the tire do not extend at right angles to the flange C', but said ribs are made approximately V-shaped or composed of two members extending at an angle to each other.

From the foregoing description and the drawings it will be seen that I have provided a very strong and durable tire which can be readily secured on any car wheel and which, in case of injury thereto, can be quickly removed and replaced by a new one without removing the wheel from its axle or sending the car to the repair shops.

I am aware that changes in the form and proportion of parts and details of construction of the devices herein shown and described as an embodiment of my invention can be made without departing from the spirit or sacrificing the advantages thereof, and I therefore reserve the right to make such changes and alterations therein as fairly fall within the scope of the same. For example, instead of passing the securing bolts, by which the sections of the tire are secured together, through the passages in the lugs, D, and screwing nuts thereon I may in some cases thread the passages in said lugs and screw the connecting bolts therein. Again, instead of having an annular peripheral rib on the body of the wheel fitting into a suitable groove in the tire other means for forming a rigid connection between the wheel and tire may be employed.

Having thus fully described my invention, what I claim as new, and desire to secure by Letters Patent, is—

1. The combination of a railway car wheel provided with an annular peripheral rib, a tire composed of a series of sections provided on their inner ends with grooves adapted to receive the peripheral rib on the wheel, and means for rigidly connecting the sections of the tire together, substantially as described.

2. The combination of a railway car wheel provided with an annular peripheral rib, of a tire composed of a series of sections each of which is provided on its inner face with a groove adapted to receive the rib on the wheel, lugs attached to said sections and extending partially over the body of the wheel, and means for rigidly connecting the lugs on adjacent sections, substantially as and for the purpose described.

In testimony whereof I affix my signature in presence of two witnesses.

JOHN ROLLING.

Witnesses:
CHRISTIAN STORR,
JACOB DEMUTH.